(12) United States Patent
Ryu et al.

(10) Patent No.: US 7,805,519 B2
(45) Date of Patent: Sep. 28, 2010

(54) METHOD AND SYSTEM FOR SENDING VIDEO SIGNAL BETWEEN DIFFERENT TYPES OF USER AGENTS

(75) Inventors: Young-Sook Ryu, Suwon-si (KR); Seong-Joon Jeon, Yongin-si (KR); Jun-Hwa Seo, Suwon-si (KR); Soung-Kwan Kim, Suwon-si (KR); Taek-Ho Kim, Suwon-si (KR); Ji-Youn Jung, Seoul (KR); Kwang-Yong Choi, Suwon-si (JP); Hyun-Min Yoon, Suwon-si (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 896 days.

(21) Appl. No.: 11/289,607

(22) Filed: Nov. 30, 2005

(65) Prior Publication Data

US 2006/0123013 A1    Jun. 8, 2006

(30) Foreign Application Priority Data

Dec. 6, 2004    (KR)    ................ 10-2004-0102001

(51) Int. Cl.
G06F 15/16    (2006.01)
(52) U.S. Cl. ........................... 709/227; 709/204
(58) Field of Classification Search ........ 709/227
See application file for complete search history.

(56) References Cited

U.S. PATENT DOCUMENTS

| | | | | |
|---|---|---|---|---|
| 6,922,568 | B1 * | 7/2005 | Nakamura | 455/462 |
| 7,058,356 | B2 * | 6/2006 | Slotznick | 455/3.05 |
| 7,194,235 | B2 * | 3/2007 | Nykanen et al. | 455/3.01 |
| 7,398,316 | B2 * | 7/2008 | Tenhunen | 709/227 |
| 2003/0177445 | A1 * | 9/2003 | Sunata | 715/513 |
| 2003/0218682 | A1 * | 11/2003 | Lim et al. | 348/333.11 |
| 2004/0008635 | A1 | 1/2004 | Nelson et al. | |
| 2004/0117820 | A1 * | 6/2004 | Thiemann et al. | 725/37 |
| 2004/0210658 | A1 * | 10/2004 | Guillermo et al. | 709/227 |

(Continued)

FOREIGN PATENT DOCUMENTS

WO    WO 03/052570    6/2003

OTHER PUBLICATIONS

Marc Bechler, Quality of Service in Mobile and Wireless Networks: The Need for Proactive and Adaptive Applications, 2000, Institute of Telematics, University of Karlsruhe.*

(Continued)

*Primary Examiner*—Firmin Backer
*Assistant Examiner*—Arvin Eskandarnia
(74) *Attorney, Agent, or Firm*—H.C. Park & Associates, PLC

(57) ABSTRACT

A method for scaling a display size between different types of user agents. The method includes exchanging session initiation protocol messages including media information when performing a call setup for setting up a media session between the user agents; determining any one of the user agents to scale the display size from the exchanged media information; and scaling, by the determined user agent, the display size on the basis of the media information, and sending video data subject to the scaling to the other user agent(s).

16 Claims, 6 Drawing Sheets

U.S. PATENT DOCUMENTS

| | | | |
|---|---|---|---|
| 2005/0033821 A1* | 2/2005 | Shin et al. | 709/217 |
| 2005/0232309 A1* | 10/2005 | Kavaler | 370/519 |
| 2006/0059231 A1* | 3/2006 | Takatori et al. | 709/206 |
| 2006/0125927 A1* | 6/2006 | Watanabe | 348/211.1 |
| 2007/0186002 A1* | 8/2007 | Campbell et al. | 709/231 |

OTHER PUBLICATIONS

European Office Action of the European Patent Application No. 05 02 6105, issued on Apr. 24, 2006.

An article "Adaptive Multimedia Multi-party Communication in Ad Hoc Environments" written by Ruiz et al., published in System Sciences, Proceedings of the 37th Haw aii International Conference on Sy stem Sciences—2004, pp. 293-302 on Jan. 5, 2004.

An article "Session Initiation Protocol (SIP) Session M obility draft-schacham-sipping-session-mobility -00" written by Shacham et al., retrieved from the Internet, pp. 16-21 on Feb. 14, 2005.

An article "Internet Telephony" written by Schulzrinne, retrieved from the Internet, pp. 14-18 on Nov. 1, 2004.

* cited by examiner

METHOD AND SYSTEM FOR SENDING VIDEO SIGNAL BETWEEN DIFFERENT TYPES OF USER AGENTS

CLAIM OF PRIORITY

This application makes reference to, incorporates the same herein, and claims all benefits accruing under 35 U.S.C. §119 from an application for METHOD AND SYSTEM FOR SENDING VIDEO SIGNAL BETWEEN DIFFERENT TYPES OF USER AGENTS, filed in the Korean Intellectual Property Office on Dec. 6, 2004 and there duly assigned Serial No. 2004-102001.

BACKGROUND OF THE INVENTION

1. Field of the Invention

The present invention relates generally to a method and system for scaling a display size between different types of user agents, and more particularly, to a method and system for scaling a display size between different types of user agents, in which, when data are sent between two different user agents performing video communication through a network, the display size of each of the user agents is scaled by using media information that is included in and exchanged between the user agents.

2. Description of the Related Art

VoIP (Voice over Internet Protocol), a service delivering video, audio, and facsimile messages over the Internet, sends real-time media such as audio and video in various situations, such as when a user accesses the Internet via a personal computer (PC), using an independent device to which IP (Internet Protocol) is applied, or by making a telephone call by means of a gateway at a public switched telephone network (PSTN) station.

The VoIP requires a means for finding and signaling a counterpart intended for communication when providing service. There are two kinds of this VoIP signaling: H.323 of Telecommunication Standardization Sector of the International Telecommunications Union (ITU-T), and SIP (Session Initiation Protocol) of Internet Engineering Task Force (IETF).

For some time, VoIP services have been developed based on the H.323. However, the SIP, which is currently on the rise, has easy parsing and compiling, excellent extensibility, and also has the advantage over the H.323 of being easily implemented because it is based on text.

The SIP is used as an application layer control protocol for generation, modification, and termination of a multimedia session or call between at least two user agents in an IP-based network, and includes multimedia conference, internet telephone call, remote education, and other functions. The SIP is modeled on the basis of SMTP (Simple Mail Transfer Protocol), E-mail, HTTP (Hypertext Transfer Protocol), and Web.

As such, the SIP may be referred to as a client-server protocol where a client sends a request and where a server receives the request and sends a response.

The SIP controls the architecture of an incorporated protocol, such as RSVP (Resource Reservation Protocol) for reservation of network resources, RTP (Real-Time Protocol) for real-time data transmission and provision of QoS (Quality of Service) feedback, RTSP (Real Time Streaming Protocol) for transmission control of streaming media, SAP (Session Announcement Protocol) for advertising a multimedia session through a multicast, and SDP (Session Description Protocol) for description of a multimedia session. However, the SIP functions and operates independent of any one of these protocols.

An SIP address is allocated to a user of each host in the format of an E-mail address, such as user@host. For example, as in test@sam.com, kim@sam.com, or 010-9000-10000@165.213.238.1, a part designating the user maybe a name, a telephone number, etc., of the user, and a part designating the host may be a domain name or an IP address. Thus, in most cases, a user's SIP URL (Uniform Resource Locator, previously Universal Resource Locator) can be inferred from the user's E-mail address.

The user client makes use of an SIP server address of a receiver when sending an SIP request. Here, when the SIP server address is a numerical IP address, the user client sends the SIP request to the corresponding IP address. In contrast, when the SIP server address is made up of the domain name, the user client locates the IP address with reference to a DNS (Domain Name Server), and then sends the SIP request. When receiving the SIP request, the SIP server of the receiver makes it possible to gain access to a location server, check location information registered by a registration procedure of the receiver, and then send the SIP request to the receiver.

A flow of messages for call connection between a UAC (User Agent Client) and a UAS (User Agent Server), according to conventional art, is problematic, wherein the media information includes a type of the media (video, audio, etc.), a transfer protocol (RTP/UDP/IP, H.320, etc.), a format of the media (H.261 video, MPEG video, etc.), and so forth.

Since the exchanged media information includes only information on the type, compression method, etc., of the media, the determination of whether the media is processible, and consequently whether to send an acknowledgement message to establish a call, is based solely on such information.

In this scheme, it is a display size of each user agent that is problematic. In the case of exchanging only information on the compression method, information on the display size is not included, video data are encoded and sent at the display size of the sending side. If the display size of the sending side is not equal to that of the receiving side, phenomena such as afterimage, cropping, breakdown, and so forth, occur while data received on the receiving side are decoded and output on a screen.

SUMMARY OF THE INVENTION

It is, therefore, an objective of the present invention to provide a method and system for scaling a display size between different types of user agents, in which, during video communication between the different user agents, messages inclusive of video information are mutually exchanged and sent video data are scaled and sent at a proper display size, in consideration of the display size of the other user agent and performance of a CPU of each of the user agents, thereby providing a clear image.

According to an aspect of the present invention, there is provided a method for scaling a display size between different types of user agents. The method comprises: exchanging session initiation protocol (SIP) messages including media information on performing a call setup for setting up a media session between the user agents; determining one of the user agents to scale the display size from the exchanged media information; and scaling, by the determined user agent, the display size on the basis of the media information, and sending video data subject to the scaling to the other user agent(s).

Here, the media information may be sent through a service description protocol (SDP) of the SIP, and may include at least one of a type of media intended for communication, a display standard of the user agent sending the media information, and performance of a central processing unit (CPU) of the user agent sending the media information.

Further, the exchanging of the SIP messages may include sending, by the user agent client, an INVITE message to the user agent server, and requesting setup of a media session, wherein the INVITE message includes the media information of the user agent client.

Further, determining one of the user agents may include: determining, by the user agent server receiving an INVITE message from the user agent client, whether the type of the media included in the media information is processible at the user agent server; as a result of the determination, if the type of the media included in the media information is processible at the user agent server, comparing the display size and the performance of the CPU of the user agent server with the display size and the performance of the CPU of the user agent client, respectively, and differently setting a value of a scaling_flag parameter based on a result of the comparison; and sending, by the user agent server, the scaling_flag parameter to the user agent client, the scaling_flag parameter being included in a SDP of a Response message; and if it is determined from the value of the scaling_flag parameter that the user agent server and the user agent client have different display sizes, scaling the display size on the user agent side where the performance of the CPU is better.

Furthermore, the Response message may include the scaling_flag parameter representing information on both a value of comparing display standards and a difference in CPU performance between the user agents.

Further, the setting of the value of the scaling_flag parameter may include: comparing the display size of the user agent client with that of the user agent server, a) when the two display sizes are equal to each other, setting the value of the scaling_flag parameter to two (2); b) when the display sizes of the user agent client and the user agent server are different from each other and the user agent client has better CPU performance than the user agent server, setting the value of the scaling_flag parameter to one (1); and c) when the display sizes of the user agent client and the user agent server are different from each other and the user agent server has better CPU performance than the user agent client, setting the value of the scaling_flag parameter to zero (0).

In setting the value of the scaling_flag parameter, when the value of the scaling_flag parameter is set to zero (0), the user agent server may scale the display size, and when the value of the scaling_flag parameter is set to one (1), the user agent client may scale the display size.

According to another aspect of the present invention, there is provided a system for scaling a display size between user agents. The system comprises: a) means for exchanging session initiation protocol (SIP) messages including media information with another user agent when performing a call setup for setting a media session; b) means for determining whether the display size is scaled from the exchanged media information; and c) means for sending video data subject to the scaling of the display size to the other user agent, when the display size is determined to be scaled.

Here, each of the user agents may be any one of: a user agent client making a request for a setup of a media session first, and a user agent server receiving and responding to the request.

Further, each of the user agents may include a scaling module for scaling any one of the video data to be sent and the video data received, when the display size is determined to be scaled as a result of comparing display standard and central processing unit (CPU) thereof with those of the other user agent.

Meanwhile, the media information may include at least one of a type of media intended for communication, a display standard of the user agent sending the media information, and performance of the CPU of the user agent sending the media information.

Further, the user agent client may send an INVITE message including the media information thereof and requesting setup of a media session to the user agent server.

Furthermore, the user agent server may: receive an INVITE message from the user agent client and determine whether a type of media included in the media information is processible at the user agent server; as a result of the determination, if the type of media is processible at the user agent server, compare the display size and performance of the CPU of the user agent client with those of the user agent server respectively, and differently set a value of a scaling_flag parameter; send the scaling_flag parameter to the user agent client in addition to a session description protocol (SDP) of a Response message; and if it is determined from the value of the scaling_flag parameter that the display size of the user agent server is not equal to that of the user agent client and that the CPU performance of the user agent server is better than that of the user agent client, run the scaling module.

Further, the Response message may include the scaling_flag parameter indicating information on a value of comparing a display standard of the user agent client with that of the user agent server and on a difference in CPU performance between the user agent client and the user agent server.

Further, the value of the scaling_flag parameter maybe set, by comparing the display size of the user agent client with that of the user agent server: a) to two (2) when the two display sizes are equal to each other; b) to one (1) when the display sizes of the user agent client and the user agent server are different from each other and the user agent client has better CPU performance than the user agent server; and c) to zero (0) when the display sizes of the user agent client and the user agent server are different from each other and the user agent server has better CPU performance than the user agent client.

Here, when the value of the scaling_flag parameter is set to zero (0), the user agent server may scale the display size, and when the value of the scaling_flag parameter is set to one (1), the user agent client may scale the display size.

According to yet another aspect of the present invention, there is provided a user agent for scaling a display size on the basis of a session initiation protocol (SIP). The user agent comprises: a) means for exchanging SIP messages including media information with another user agent when performing a call setup for setting up a media session; b) means for determining whether the display size is scaled from the exchanged media information; and c) means for sending video data subject to the scaling of the display size to the other user agent, when the display size is determined to be scaled.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Hereinafter, exemplary embodiments of the present invention will be described in more detail with reference to the accompanying drawings.

Figure 1:
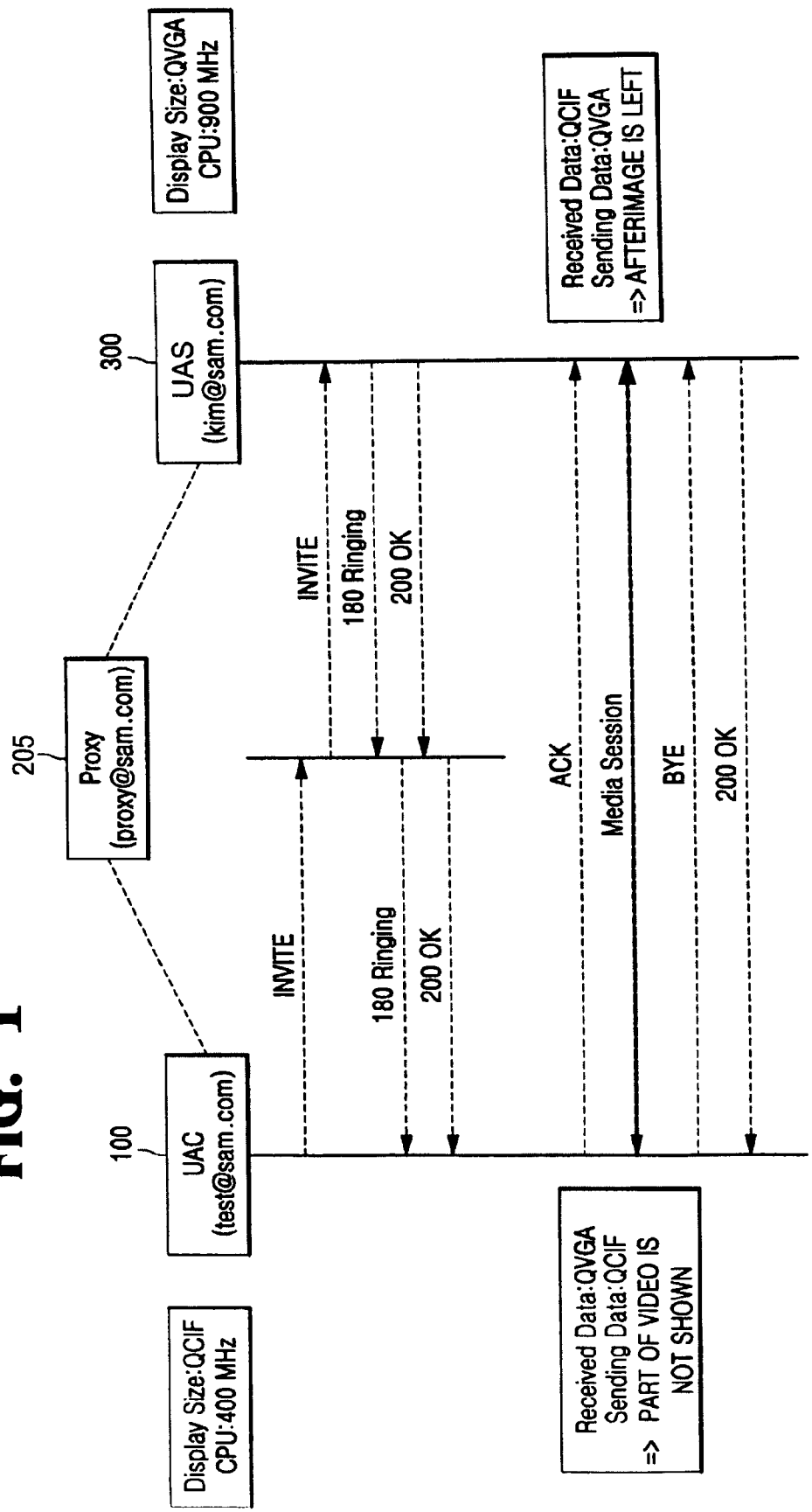
FIG. 1 shows an example of a flow of messages for call connection between a UAC (User Agent Client) and a UAS (User Agent Server)

FIG. 1 shows an example of a flow of messages for call connection between a UAC (User Agent Client) and a UAS (User Agent Server).

First, the UAC 100 requesting communication sends an INVITE message to the UAS 300 through a proxy server 205. The UAS 300 receiving the INVITE message parses a media format of the UAC 100 from media information of SDP (session description protocol) of the INVITE message.

When the UAS 300 is able to process the corresponding media format, it sends a 180 Ringing message and a 200 OK message to the UAC 100 through the proxy server 205. The UAC 100 receiving the 180 Ringing and 200 OK messages sends an acknowledgment message ACK to the UAS 300. Through this procedure, a call setup is completed.

After the call setup is completed, a session is set between the UAC 100 and the UAS 300 so that a call is established. When the call is terminated, all communication procedures are terminated through interchange of a BYE message and the 200 OK message.

A body (SDP: RFC 2327) of the INVITE message which the UAC 100 requesting the call sends to the UAS 300 includes information on a name and purpose of the session, activation time of the session, media constituting the session, where to send the media, where to receive the media, and so forth.

The media information includes a type of the media (video, audio, etc.), a transfer protocol (RTP/UDP/IP, H.320, etc.), a format of the media (H.261 video, MPEG video, etc.), and so forth.

Since the exchanged media information includes only information on the type, compression method, etc., of the media, the UAS's determination of whether the media is processible, and consequently whether to send the ACK message to establish a call, is based solely on such information.

In the scheme of FIG. 1, it is a display size of each user agent that is problematic. As illustrated, in the case of exchanging only information on the compression method, information on the display size is not included, video data are encoded and sent at the display size of the sending side. If the display size of the sending side is not equal to that of the receiving side, phenomena such as afterimage, cropping, breakdown, and so forth, occur while data received on the receiving side are decoded and output on a screen.

Figure 2:
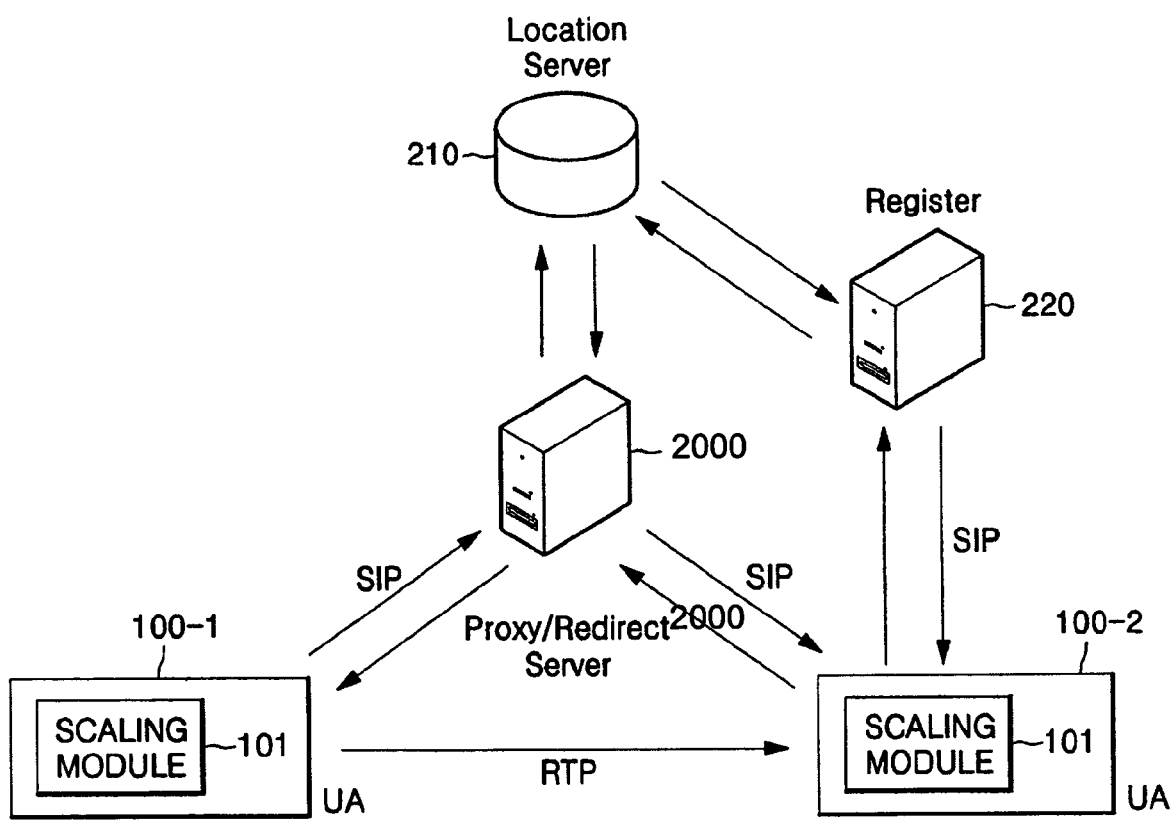
FIG. 2 shows a structure of an SIP (Session Initiation Protocol) system to which the present invention is applied.

FIG. 2 shows a structure of an SIP (Session Initiation Protocol) system to which the present invention is applied.

The SIP system is generally composed of at least one user agent, a network server and a location server.

In general, the user agents 100-1 and 100-2 are classified into two kinds of entities: one serves as a UAC (User Agent Client) having a function as a client that initiates an SIP request, and the other serves as a UAS (User Agent Server) having a function as a server that receives the SIP request and sends a response to the SIP request.

Each of the user agents according to the present invention includes a scaling module 101 for converting video information depending on a difference in the display size thereof. The scaling module 101 will be described below in detail. When the display size of the UAC is different from that of the UAS, the UAC and the UAS are compared with each other with respect to performance of their central processing units (CPU), and video information is converted at the scaling module of the user agent having better CPU performance.

The network server 2000 is called a next-hop server, and serves either to parse a location of a receiver for which the client makes a request to connect to another server at which the receiver is located, or to inform the client about the location of the other server at which the receiver is located.

The network server 2000 is classified again into two types according to a method of delivering the SIP request: a proxy server and a redirect server. The proxy server determines where to send requests received from clients and whether to directly provide services based on the requests or send the requests to other servers. The proxy server should be provided with location service in order to exactly detect where the receiver is located. The redirect server receives the SIP request, translates its address into a new address, and returns the new address to the client.

The location server 210 performs various functions such as registering a present location of a user, updating a location according to movement of the user, etc. The register 220 takes charge of receiving requests for registration.

Communication between two user agents 100-1 and 100-2 that are connected through SIP is generally performed by using RTP (Real-time Transport Protocol). RTP is a protocol for sending real-time data inclusive of audio and video, which is mainly used for both internet-phone service and interactive service, particularly conversational service. RTP is placed above UDP (User Datagram Protocol), because UDP has less transmission overhead than TCP.

Figure 3:
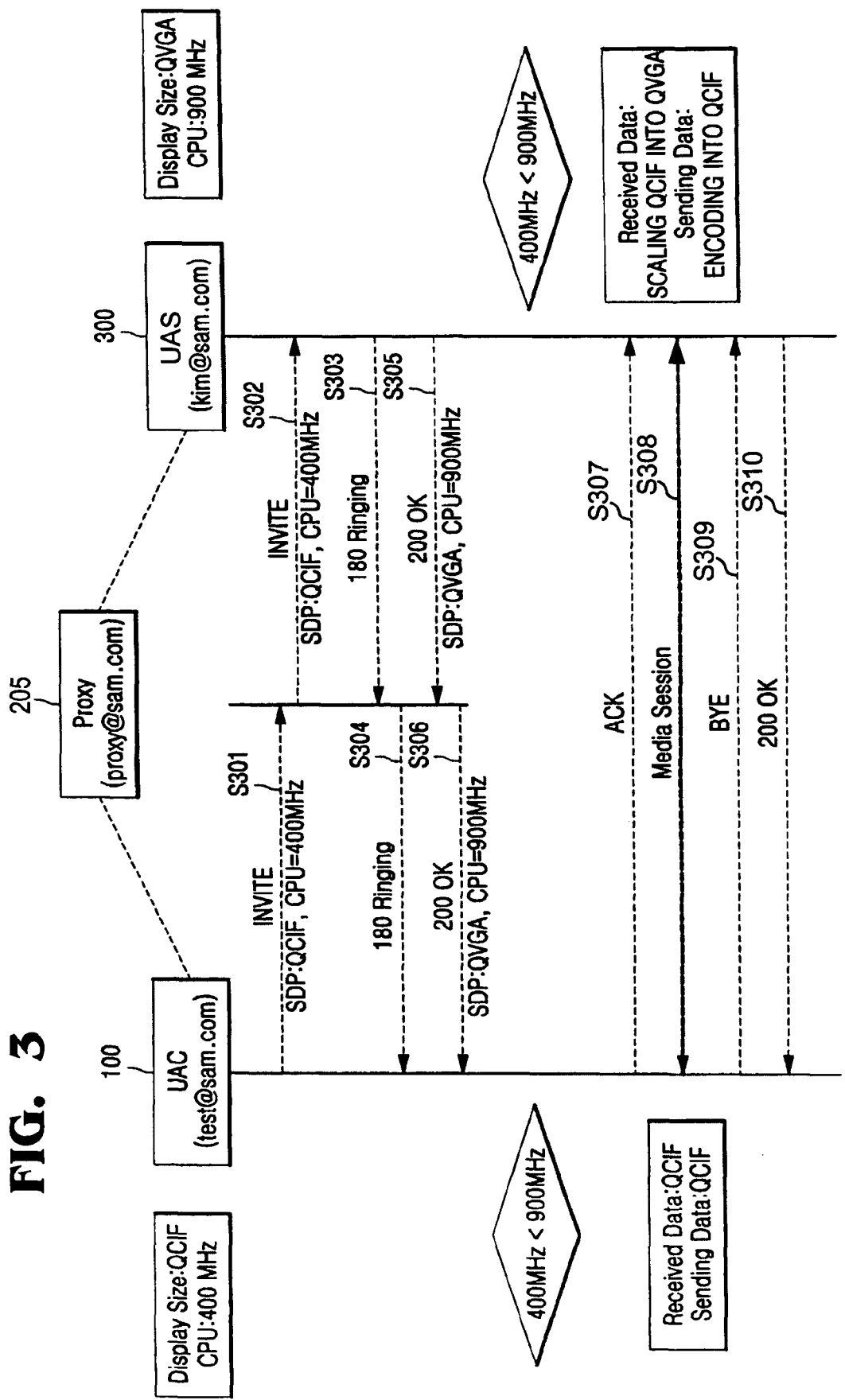
FIG. 3 illustrates a flow of messages for call connection between a UAC (User Agent Client) and a UAS (User Agent Server) in accordance with the present invention.

FIG. 3 illustrates a flow of messages for call connection between a UAC and a UAS in accordance with the present invention.

In the embodiment of FIG. 3, it is assumed that the UAC has a display size of QCIF (Quarter Common Intermediate Format) and a CPU speed of 400 MHz, and that the UAS has a display size of QVGA (Quarter Video Graphics Array) and a CPU speed of 900 MHz.

Here, CIF (Common Intermediate Format) is a video format used in the video conference system, which is conditioned on a data rate of 30 frames per second, wherein each frame contains 288 lines consisting of 352 pixels. QCIF sends about ¼ as much data as CIF, which is suitable for the video conference system using a telephone line. In order to discriminate between CIF and QCIF, CIF is often called FCIF (Full CIF).

Meanwhile, QVGA sends about ¼ as much data as VGA (Video Graphics Array). In other words, VGA has a display size of 640×480, and thus QVGA has a display size of 320×240.

A process of exchanging messages between the UAC 100 and the UAS 300 in the embodiment of FIG. 3 is similar to that of the conventional art shown in FIG. 1. However, there is a difference between these processes in that the messages include different media information. Specifically, the difference is in the media information contained in messages such as an INVITE message, a 180 Ringing message and a 200 OK message.

To begin with, the UAC 100 having the display size of QCIF, the CPU speed of 400 MHz, and the e-mail address test@sam.com sends an INVITE message to the proxy server 205 (S301). Here, the media information included in the INVITE message may be expressed as follows:

INVITE:
    m=video 49232 RTP/AVP 98
    a=rtpmap:98 L16/16000/2
    a=size QCIF
    a=cpu 400 MHz In the SDP (Session Description Protocol) of the INVITE message, "m" indicates name and transmission address of the media, and "a" is a line indicating a characteristic of the media. In the present embodiment, a total of 3 media characteristics are indicated. The first line is information on RTP, and the second and third lines include display size and CPU speed, which are added in the present invention.

The proxy server 205 receiving the INVITE message from the UAC 100 inquires of a location server at the sight of an address of the INVITE message, and receives information on an exact location of the UAS 300. The proxy server 205, which detects the exact location of the UAS 300, sends an INVITE message of the same format set forth above (S302).

The UAS 300 receiving the INVITE message sends the 180 Ringing message indicating that a receiver is given a ring to the UAC 100 through the proxy server 205 (S303 and S304).

Further, the UAS 300 sends the 200 OK message (Response) whose SDP media information carries information both on its own display size and its own CPU (S305 and S306). Here, the media information that the 200 OK message includes and takes the following format:

200 OK:
    m=video 49232 RTP/AVP 98
    a=rtpmap:98 L16/16000/2
    a=size QVGA
    a=cpu 900 MHz As mentioned above, it can be seen that the media information includes information that the display size of the user agent is QVGA and that the CPU speed is 900 MHz.

This exchange of the messages between the UAC 100 and the UAS 300 completes exchange of media information held by the UAC 100 and the UAS 300.

The UAC 100 checks whether a media format of the UAS 300 is processible through the media information of the 200 OK message received from the UAS 300, and compares its own display size with that of the UAS 300. If the display sizes are different from each other, the UAC 100 compares its own CPU speed with that of the UAS 300, and thereby determines whether to operate a scaling module (see FIG. 2).

If the UAC 100 determines the media format of the UAS 300 to be processible, it sends an acknowledgement message ACK to the UAS 300, thus completing a call setup (S307).

When a media session is set, the media are sent between the UAS 300 and the UAC 100 (S308). Since the CPU performance of the UAC 100 is lower than that of the UAS 300, the display size is scaled at the UAC 100, which will be discussed with respect to the embodiment of FIGS. 4A and 4B.

In other words, when the UAC 100 sends a format of its own QCIF message, it converts the QCIF message received from the UAS 300 into QVGA and displays the converted message.

When the UAS 300 sends video information, the UAS 300 converts a QVGA image into a QCIF image so as to be compatible with the display size of the UAC 100. By contrast, when the UAS 300 receives the video information, the UAS 300 decodes the video information sent in the format of QCIF at the UAC 100, converts the decoded information into QVGA through the scaling module, and outputs the converted result through a display device.

After call disconnection, a process of exchanging BYE and 200 OK messages (S309 and S310) is the same as in FIG. 1.

Figure 4A:
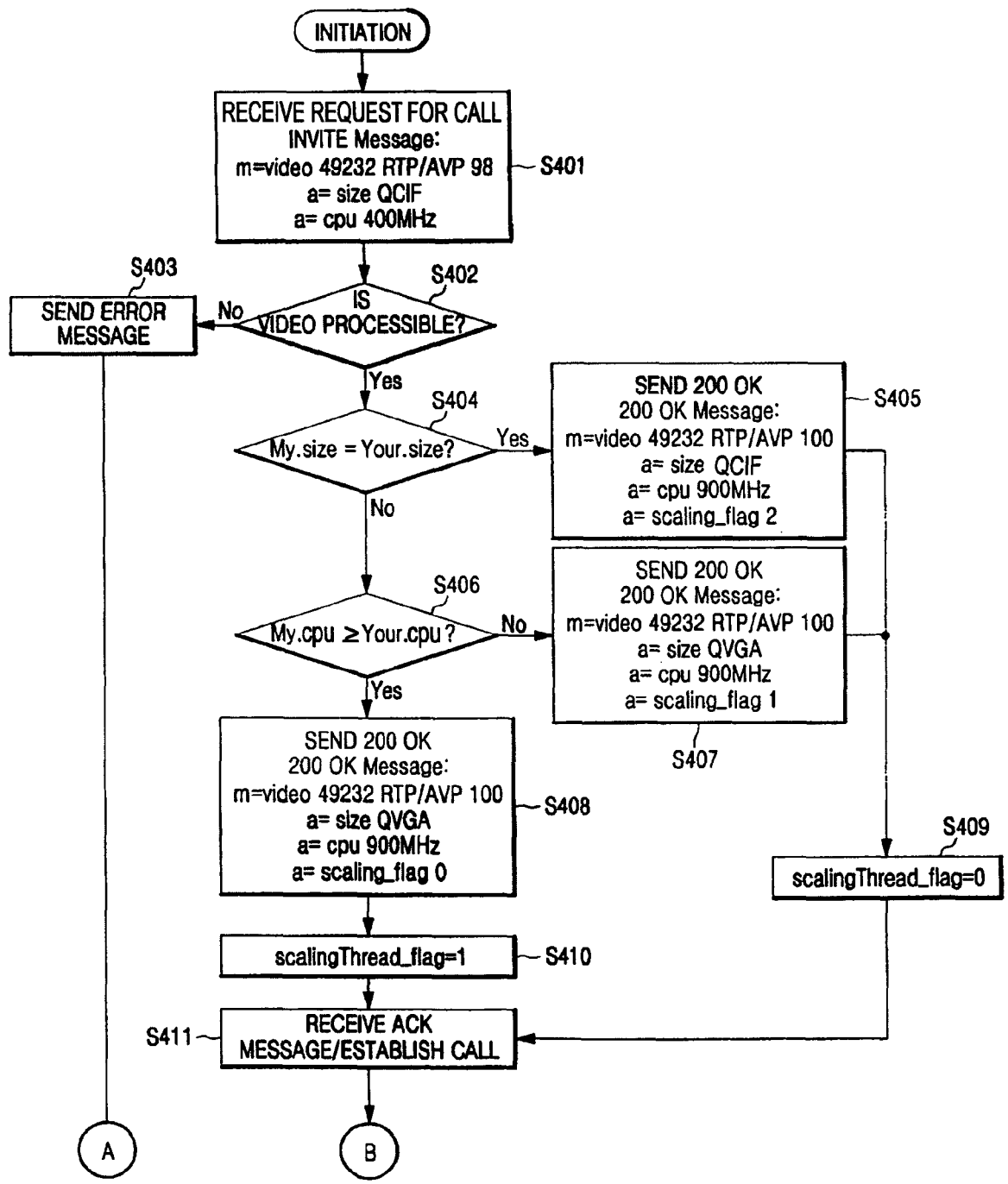
FIGS. 4A and 4B show a flow of operations of a UAS (User Agent Server) according to the present invention.
Figure 4B:
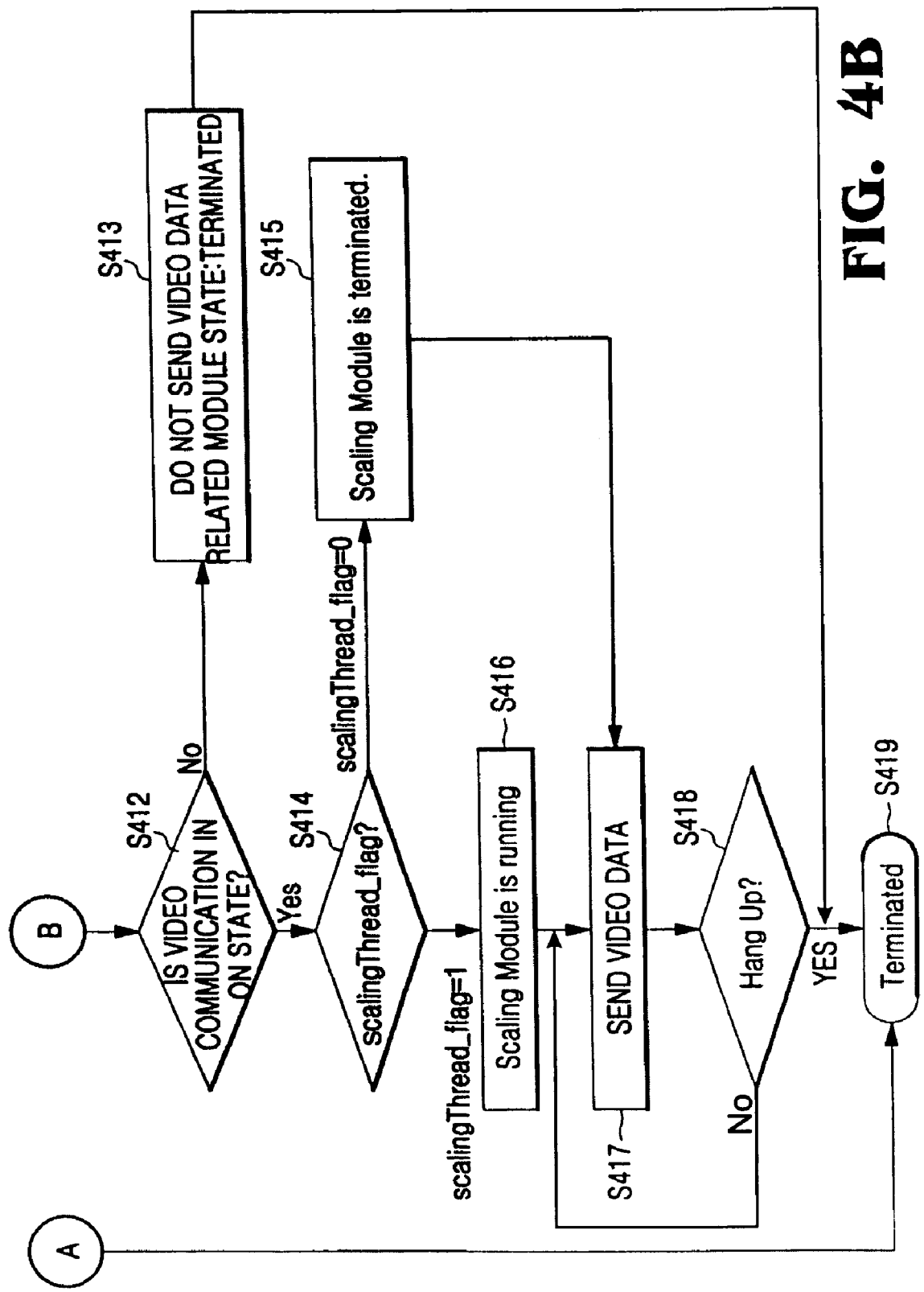

FIGS. 4A and 4B show a flow of operations of a UAS according to the present invention.

When the UAS 300 receives an INVITE message requesting a call from the UAC 100, it is checked first from the media information included in the INVITE message whether the media has a format that can be processed at the UAS 300 or not (S401). In the embodiment of FIGS. 4A and 4B, because only a video signal is received, it is sufficient to check whether the video signal can be processed at the UAS 300 or not (S402).

If the UAS 300 fails to process the video signal, it sends an ERROR message to the UAC 100 (S403). In this case, all of the corresponding processes are terminated (S419). However, if the UAS 300 determines the video signal to be processible, a display size of the UAS 300 My.size is compared with that of the UAC 100 Your.size (S404).

As a result of the comparison, if the two display sizes are equal to each other, the UAS 300 sends a 200 OK message to the UAC 100 (S405), because there is no problem in displaying the received video data. At this time, the 200 OK message includes the media information of the UAS 300, which is sent with a display standard set to QCIF, a CPU performance set to 900 MHz, and a scaling_flag parameter, which numerically indicates the relative display sizes, is set to two (2).

When the scaling_flag parameter is two (2), it means that the display sizes of the two user agents are equal to each other. Meanwhile, when the scaling_flag parameter is one (1), it means that the remote user agent (UAC 100) has better CPU performance, and when the scaling_flag parameter is zero (0), it means that the other local agent (UAS 300) has better CPU performance.

Thus, when the two display sizes are not equal to each other, the CPU speed of the UAS 300, My.cpu, is compared with the CPU speed of the UAC 100, Your.cpu, (S406). As a result of the comparison, when the CPU speed of the UAC 100 is faster, i.e., when the UAC 100 has better CPU performance, the 200 OK message is sent to the UAC 100 with the scaling_flag parameter set to 1 (S407). This makes the UAC 100 run the scaling module. The 200 OK message includes the media information of the UAS 300, which is sent with a display standard set to QVGA and a CPU performance set to 900 MHz.

When the display sizes of the two user agents are the same or the CPU performance of the UAC 100 is better, the UAS 300 sends the 200 OK message to the UAC 100. Then, the UAS 300 sets a running factor of its own scaling module, scaling Thread_flag, to zero (0) and restricts the running of the scaling module (S409).

On the other hand, when the CPU performance of the UAS 300 is better than or equal to that of the UAC 100, the UAS 300 has to run the scaling module. Thus, the UAS 300 sends the 200 OK message with the scaling_flag parameter set to zero (0) (S408), and sets its own scaling Thread_flag to one (1) (S410). The 200 OK message includes the media information of the UAS 300, which is sent with a display standard set to QVGA and a CPU performance set to 900 MHz.

In all cases, after sending the 200 OK message, the UAS 300 receives an ACK message from the UAC 100 and establishes a call (S411). The UAS 300 checks a state of video communication that is request by the UAC 100 (S412). When the video communication is not in an ON state, the UAS 300 does not send video data and terminates all operations of related modules (S413).

When the video communication is in an ON state, the UAS 300 checks a value of the scaling Thread_flag (S414). When the scaling Thread_flag value is zero (0), the UAS 300 does not run the scaling module (S415). When the UAS 300 does not run the scaling module, the UAC 100 runs the scaling module to perform conversion of the video data, so that the UAS 300 has only to send the video data to the UAC 100 (S417).

When the scaling Thread_flag value is one (1), the UAS 300 runs the scaling module (S416). After the UAS 300 runs the scaling module, the UAS 300 converts and sends its own video data so as to be compatible with the display size of the UAC 100 (S417).

A predetermined time after the video data is exchanged between both of the user agents through a series of processes, the user terminates communication. In this case, all of the corresponding processes are terminated (S419).

Figure 5:
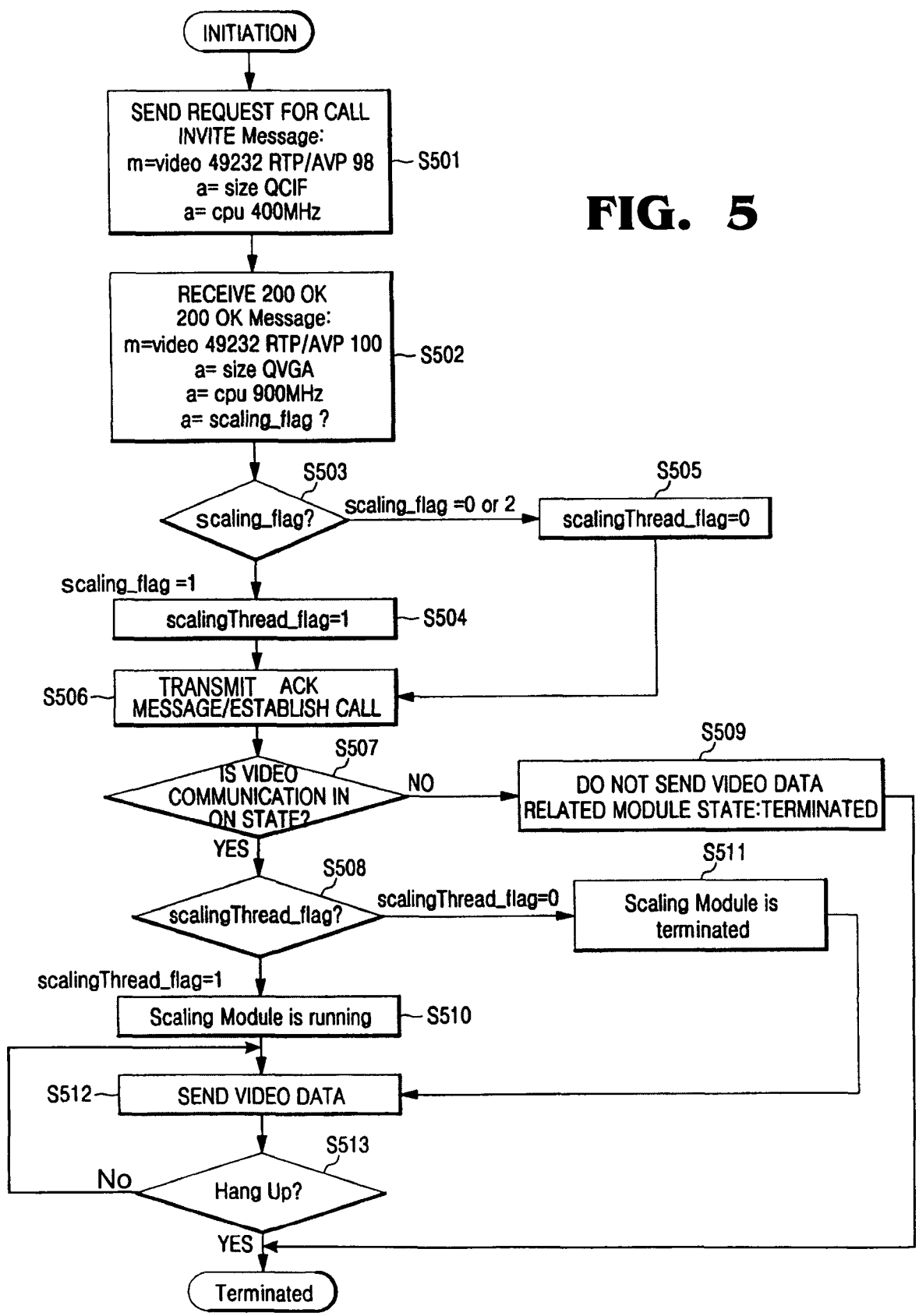
FIG. 5 shows a flow of operations of a UAC (User Agent Client) according to the present invention.

FIG. 5 shows a flow of operations of a UAC according to the present invention.

The UAC 100 requests a call through an INVITE message (S501). Media information included in the INVITE message shows that the media is video, a display size is QCIF, and a CPU speed is 400 MHz.

When the UAS300 can process the video signal, the UAC100 receives a 200 OK message from the UAS 300 (S502). Here, the 200 OK message includes an SDP (Session Description Protocol) having media information of the UAS 300.

It can be seen from FIG. 5 that the UAS300 has a display size of QVGA and a CPU speed of 900 MHz. The media information further includes a scaling_flag parameter as discussed with respect to FIGS. 4A and 4B. The UAC 100 determines whether to run its own scaling module according to a value of the scaling_flag parameter (S503).

When the scaling_flag parameter is 0 or 2, a value of a running factor of the scaling module, scaling Thread_flag, is set to zero (0) (S505).

However, when the scaling_flag parameter is 1, the scaling Thread_flag value is set to 1 (S504).

In all cases of receiving the 200 OK message, the UAC100 sends an ACK message to the UAS 300, so that a call is established between the user agents (S506).

The UAC 100 checks a state of video communication (S507). When the video communication is not in an ON state, the UAC 100 does not send video data and terminates all operations of related modules (S509).

However, when the video communication is in an ON state, the UAC 100 checks the scaling Thread_flag value (S508). When the scaling Thread_flag value is zero (0), the UAC 100 does not run the scaling module (S511). And, when the scaling Thread_flag value is one (1), the UAC 100 runs the scaling module (S510).

When the UAC100 does not run the scaling module, the UAS300 runs the scaling module to perform conversion of the video data. Hence, the UAC 100 has only to send the video data to the UAS 300 (S512).

Whereas, when the UAC 100 runs the scaling module, the UAC 100 converts and sends video data so as to be compatible with the display size of the UAS 300 (S512).

A predetermined time after the video data is exchanged between both of the user agents through a series of processes, the user terminates the communication. In this case, all of the corresponding processes are terminated (S513).

According to the present invention, when video communication is performed between different types of user agents, the size of an image is adjusted to a display size, so that unfavorable phenomena such as afterimage, cropping, breakdown, and so forth, caused by a difference between the display sizes, can be eliminated.

Although the exemplary embodiments of the present invention have been described, it is natural that various changes and modification can be made within the spirit and scope of the present invention. Therefore, the scope of the present invention is not limited to the described embodiments, but determined by the following claims and their equivalents.

What is claimed is:

1. A method for scaling a display size between different types of user agents by using a session initiation protocol, the method comprising:

exchanging session initiation protocol messages, including media information when performing a call setup for setting up a media session, between the user agents;

determining one of the user agents to scale the display size, in response to the exchanged media information;

scaling, by the determined user agent, the display size on the basis of the media information, and sending video data subject to the scaling to the other user agent;

the media information includes at least one of a type of media intended for communication, a display standard of the user agent sending the media information, and performance of a central processing, unit of the user agent sending the media information, the step of determining one of the user agents to scale the display size includes:

determining, by a user agent server receiving an INVITE message from a user agent client, whether the type of the media included in the media information is processable at the user agent server;

as a result of the determination, if the type of the media included in the media information is processable at the user agent server, comparing the display size and the performance of the central processing unit of the user agent server with the display size and the performance of the central processing unit of the user agent client, respectively, and differently setting a value of a $scaling_{13}flag$ parameter based on a result of the comparison;

sending, by the user agent server, the $scaling_{13}flag$ parameter to the user agent client, the $scaling_{13}flag$ parameter being included in a service description protocol of a Response message; and if it is determined from the value of the $scaling_{13}flag$ parameter that the user agent server and the user agent client have different display sizes, scaling the display size on the user agent side where the performance of the central processing unit is better.

2. The method of claim 1, wherein the media information is sent through a service description protocol of the session initiation protocol.

3. The method of claim 1, wherein the exchanging of the session initiation protocol messages includes sending, by a user agent client, an INVITE message including the media information of the user agent client and requesting setup of a media session, to a user agent server.

4. The method of claim 1, wherein the Response message includes the $scaling_{13}flag$ parameter representing information on both a value comparing display standards and a difference in the performance of the central processing unit between the user agents.

5. The method of claim 1, wherein the setting of the value of the $scaling_{13}flag$ parameter includes: comparing the display size of the user agent client with that of the user agent server,
   a) when the two display sizes are equal to each other, setting the value of the $scaling_{13}flag$ parameter to two (2);
   b) when the display sizes of the user agent client and the user agent server are different from each other, and when the user agent client has better central processing unit performance than the user agent server, setting the value of the $scaling_{13}flag$ parameter to one (1); and
   c) when the display sizes of the user agent client and the user agent server are different from each other, and when the user agent server has better central processing unit performance than the user agent client, setting the value of the $scaling_{13}flag$ to zero (0).

6. The method of claim 5, wherein, when the value of the $scaling_{13}flag$ parameter is set to zero (0), the user agent server scales the display size.

7. The method of claim 5, wherein, when the value of the $scaling_{13}flag$ Parameter of the Response message that the user agent client receives is set to one (1), the user agent client scales the display size.

8. A system for scaling a display size between user agents performing communication by using a session initiation protocol, the system comprising:
   a module for exchanging session initiation protocol messages including media information with another user agent when performing a call setup for setting a media session;
   a module for determining whether the display size is to be scaled, in response to the exchanged media information;
   a module for sending video data subject to the scaling of the display size to the other user agent when it is determined the display size is to be scaled;
   each of the user agents comprising:
      a user agent client making a request for a setup of a media session first; and
      a user agent server receiving and responding to the request, with the user agent server;
   receiving an INVITE message from the user agent client and determines whether a type of media included in the media information is processable at the user agent server;
   as a result of the determination, if the type of media is processable at the user agent server, respectively comparing the display size and performance of a central processing unit of the user agent client with those of the user agent server, and setting a value of a $scaling_{13}flag$ parameter in response to a result of the comparison;
   sending the $scaling_{13}flag$ parameter to the user agent client in addition to a session description protocol of a Response message; and
   when it is determined from the value of the $scaling_{13}flag$ parameter that the display size of the user agent server is not equal to that of the user agent client, and that the performance of the central processing unit of the user agent server is better than that of the user agent client, running a scaling module for scaling the display size.

9. The system of claim 8, wherein each of the user agents includes a scaling module for scaling any one of video data to be sent and received video data, when it is determined the display size is to be scaled as a result of comparing display standards and performance central processing units of the other user agents to each other.

10. The system of claim 8, wherein the media information includes at least one of a type of media intended for communication, a display standard of the user agent sending the media information, and performance of a central processing unit of the user agent sending the media information.

11. The system of claim 8, wherein the user agent client sends an INVITE message including the media information thereof and requesting setup of a media session to the user agent server.

12. The system of claim 8, wherein the Response message includes the $scaling_{13}flag$ parameter indicating information on a value of comparing a display standard of the user agent client with that of the user agent server or on a difference in central processing unit performance between the user agent client and the user agent server.

13. The system of claim 8, wherein the value of the $scaling_{13}flag$ parameter is set, by comparing the display size of the user agent client with that of the user agent server:
   to two (2) when the two display sizes are equal to each other;
   to one (1) when the display sizes of the user agent client and the user agent server are different from each other and the user agent client has better central processing unit performance than the user agent server; and
   to zero (0) when the display sizes of the user agent client and the user agent server are different from each other, and the user agent server has a better or same central processing unit performance than the user agent client.

14. The system of claim 13, wherein, when the value of the $scaling_{13}flag$ parameter is set to zero (0), the user agent server scales the display size.

15. The system of claim 13, wherein, when the value of the $scaling_{13}flag$ parameter of the Response message that the user agent client receives is set to one (1), the user agent client scales the display size.

16. The system of claim 8, wherein the media information is sent through a session description protocol of the initiation protocol.

* * * * *